Nov. 23, 1965  L. E. DUNWIDDIE ETAL  3,219,856
MOTOR THERMAL PROTECTION SYSTEM
Filed Oct. 23, 1962  2 Sheets-Sheet 1
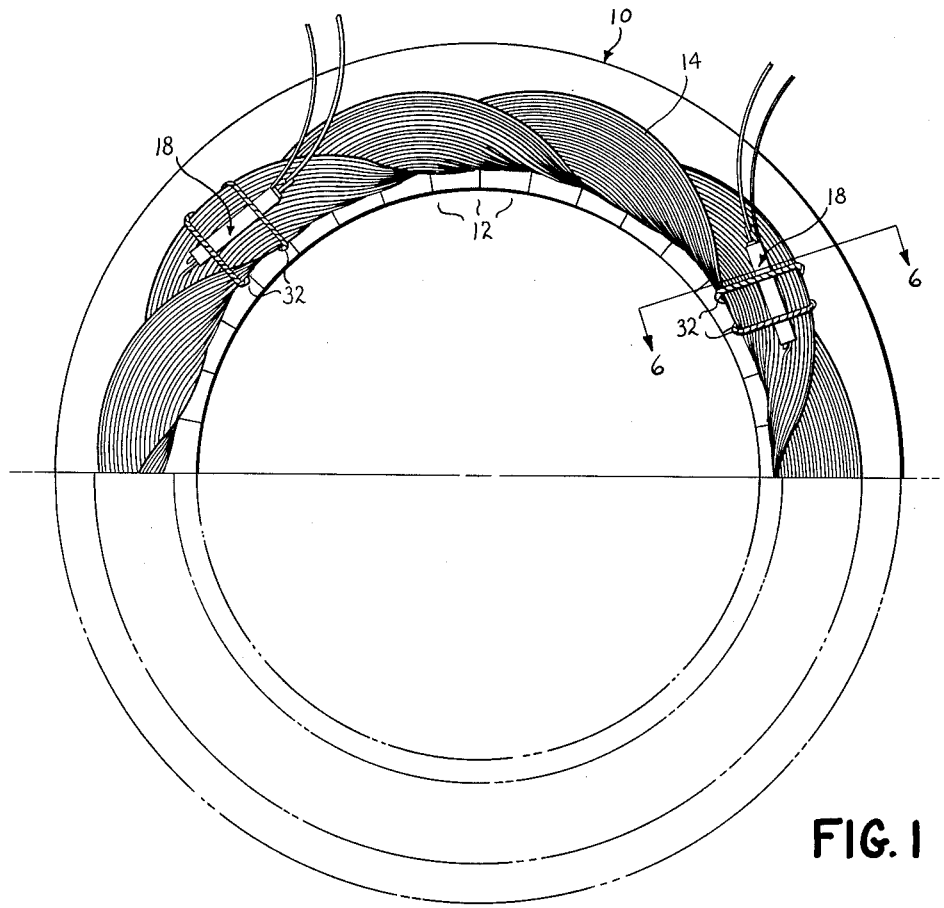
FIG. 1
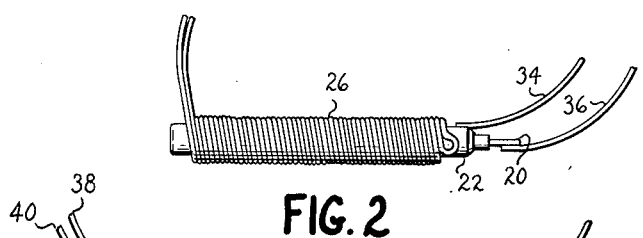
FIG. 2
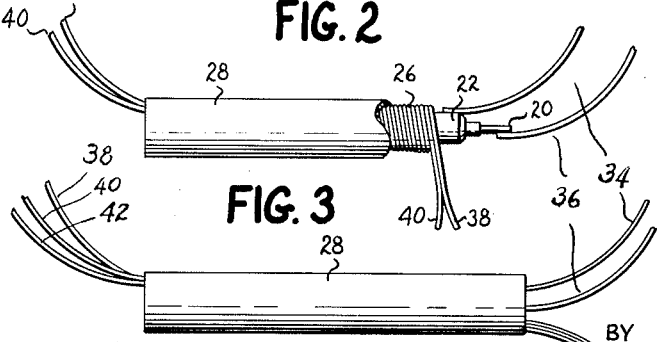
FIG. 3
FIG. 4
INVENTORS
LLOYD E. DUNWIDDIE
LEROY MOLLENBERG
WARREN N. McCROSKEY
BY James R. Campbell
THEIR ATTORNEY

United States Patent Office 3,219,856
Patented Nov. 23, 1965

3,219,856
MOTOR THERMAL PROTECTION SYSTEM
Lloyd E. Dunwiddie, Leroy Mollenberg, and Warren N. McCroskey, Fort Wayne, Ind., assignors to General Electric Company, a corporation of New York
Filed Oct. 23, 1962, Ser. No. 232,423
8 Claims. (Cl. 310—68)

The invention described herein relates to dynamoelectric machines and particularly to a motor thermal protection system.

Until recently thermal overload devices used for protecting a motor against over-temperature conditions were located remote from the motor, usually in the motor-stator enclosure, and were designed to measure over-current rather than over-temperature. In this kind of arrangement, line current heats a thermostat, thereby simulating instead of measuring the actual temperature rise in the motor. The primary disadvantage of these replica devices is they do not provide protection against over-temperature conditions resulting from failure to start, lack of ventilation, difficult duty cycles such as long accelerations, and many other causes besides current over-load conditions.

To overcome these disadvantages, manufacturers have developed miniature thermostats adapted for positioning in the windings for providing inherent thermal protection to the motor. These thermostats or heat sensing elements usually take the form of an enclosed bi-metal disc or strip, resistance coil or strip, or a rod-tube-linkage arrangement for interrupting the line current when over-temperature conditions take place. To permit sensing the winding temperature as accurately as possible, any one of these known heat sensing elements can be embedded in the winding end turns and therefore lie in direct contact with at least some of the conductors of a winding whose temperature is being measured. Because of the close association of the conductors and device in the confined space provided in the end turns, satisfactory control against over-temperature conditions in a motor is made possible.

However, the configuration of such devices precludes full surface contact between the current carrying conductors of the motor winding and the heat sensing devices so that the temperature condition of the winding is not immediately transmitted to and sensed by such devices. Moreover, special manufacturing steps involving forming an opening in the end turns for reception of the sensing device must be carried out, thus increasing the over-all motor costs. The need to provide such an opening also establishes the possibility that insulation on the conductors may be damaged during the process of forming the opening for the heat sensing device. In addition to this, the element may be distorted if it is rigidly locked in place and substantial end turn movement occurs when the motor is subjected to high starting currents. Any damage to the element causes it to respond in a manner other than that originally intended.

The primary object of our invention therefore is to provide an improved thermal protection system for a dynamoelectric machine which will accurately measure over-temperature conditions in the motor winding.

Another object of our invention is the provision of a thermal protective device useful in safe-guarding electrical equipment against winding burn-out.

Briefly stated, we carry out the above objects of our invention by positioning a coil of wire around a heat sensing or thermal protective device which is attached directly to the exposed surfaces of winding end turns in a motor or generator. The coil is connected in series with a turn of wire in one phase of the motor in order to obtain the application of a temperature to the heat sensing element which is the same as that appearing in the winding of the machine. It will be apparent to those skilled in the art that modifications of this arrangement will reside in utilizing more than one coil on each heat sensing device, or a number of heat sensing devices, each of which would be located in separate phases or even separate windings of a motor for sensing the temperature of the coils therein.

While the specification concludes with claims particularly pointing out and distinctly claiming the subject matter which we regard as our invention, it is believed the invention will be better understood from the following description taken in connection with the accompanying drawing in which:

FIGURE 1 is a perspective view of a stator core having a winding therein and including heat sensing elements disposed at predetermined points on the end turn surfaces;

FIGURE 2 is a view in elevation illustrating a heat sensing device adapted for mounting on the end turn surfaces;

FIGURES 3 and 4 illustrate modifications of the coil used for encompassing a heat sensing element adapted for attachment to the end turns;

Figure 6:
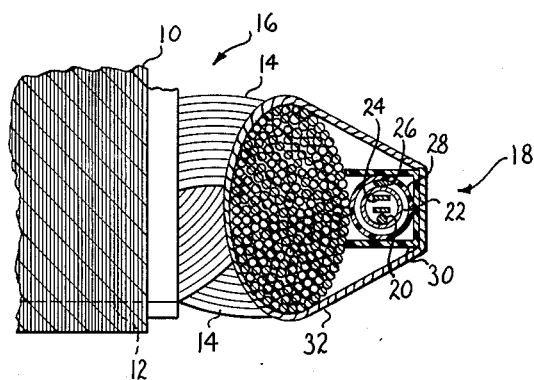
FIGURE 6 is a view taken in lines 6—6 of FIGURE 1.

Referring now to the drawings wherein like reference characters designate like or corresponding parts throughout the several views, there is shown generally in FIGURES 1 and 6, a conventional stator for a motor including a multitude of silicon steel laminations 10 stacked together to form a magnetic core. The core is equipped with slots 12 on its inner peripheral surface for receiving coils 14 comprising a multitude of insulated conductors having end turns 16 projecting outwardly from opposite ends of the core. The end turns are disposed in a concentric fashion adjacent the core periphery and the coil and cable leads and connections (not shown) are located on their outer surfaces in a manner well known in the art. The winding of the particular stator chosen for illustrating the invention is connected for three phase operation but a single phase winding, or a pair of windings used for part winding starting, can be used just as well.

In order to provide inherent thermal protection to the motor and protect against winding burn-out for any reason involving over-temperature conditions, thermal sensing devices 18 are attached to the end portions of the end turns in the manner illustrated in the drawing. These devices respond to temperature in the motor winding and act to interrupt line current to the motor when a predetermined high level of temperature, or rate of change of temperature is reached. Although the sensing devices are shown on the ends of the end turns, it will be apparent they can be located at any point on the winding, but preferably, in the hottest area of the end turns. This position will vary depending on the type of motor and its application in any particular system.

The protective or heat sensing device 18 used in sensing the temperature of the motor winding, in its preferred form, consists of a rod-tube-switch arrangement of the type disclosed in the copending application of C. Grimshaw, Serial Number 78,923, filed December 28, 1960, entitled "Thermally Responsive Switch" and assigned to the same assignee as the present invention. The device is commercially available and in general, consists of a rod 20, FIGURES 3 and 6, disposed in a tube 22. The materials for each of the bar and tube are selected to have different thermal coefficients of expansion. A motion amplifying lever arrangement (not shown) is incorporated in the tube along with a switch 24, FIGURE 6, so that when the tube expands at a higher rate than the bar, because of its greater coefficient of expansion, the motion amplifying levers move to open the switch and interrupt the supply of current to the apparatus being controlled.

Optimum control over over-temperature conditions in the winding will take place when the sensing device is subjected to the same temperature as that existing in the winding. According to our invention, this is accomplished by wrapping a coil of wire 26 around the tube 22 and connecting its ends in series with a turn in one coil of the stator winding. The wire preferably should be wound on the device such that the inner surface of adjacent turns lie in full surface contact with the exposed surface of the tube 22. Also the sides of adjacent turns should engage each other snugly so that no space appears between the turns of wire. A Mylar tube 28 is then shrunk over the coil 26 to help assure limiting the influence of air circulated by the motor rotor on the device when the machine is placed in operation.

It is highly desirable to wrap coil 26 on the tube 22 in a manner such that the turns of wire will reverse themselves and those of the two leads appears at the same time selves and those of the two leads appears at the same end of the protector. It will be apparent that with the coil wrapped on the device in this manner, current will flow in a clockwise direction along the length of the device and in a counterclockwise direction in the turns of wire which are reversed on themselves. The turns of wire in the coil therefore produce no net flux axially along the device thereby providing a zero M.M.F. coil. The advantages gained from this arrangement is that no net flux is produced in the device, and no force will be applied to the device when operating in a flux field, and it is easier to insulate the coil since both leads are located at the same end of the device. If the turns of wire are not reversed on themselves, the switch elements 24 chatter and the whole device vibrates to a considerable extent when placed in the varying flux field. Erratic operation is therefore minimized by utilizing this arrangement of the coil on the protective device.

Various means may be employed for attaching the protective or sensing device to the coil end turns. In the preferred embodiment, a square or cylindrical shaped housing 30 of insulating material, such as glass fibers and a filler treated with an epoxy, polyester or other resin is positioned over the device and laced to the end turns with dacron or other tying cord 32. For purposes of clarity, the housing is not shown in FIGURE 1. Since the function performed by the housing is that of limiting air flow as much as possible over the protective device, any mounting arrangement may be resorted to which will protect it from this adverse influence. An important benefit gained is the open end of housing 30 permits heat to be transmitted directly to the sensing device by both radiation and conduction, thus permitting mounting it in a convenient accessible place on the end turns. The environment of the device therefore is the same as the winding end turns and they both will normally contain the same temperature level. Rapid fluctuations in winding temperature however will be sensed immediately by the sensing device because any change in load current causing a temperature rise will generate heat equally in the stator winding and the coil 26 mounted on the device.

Figure 5:
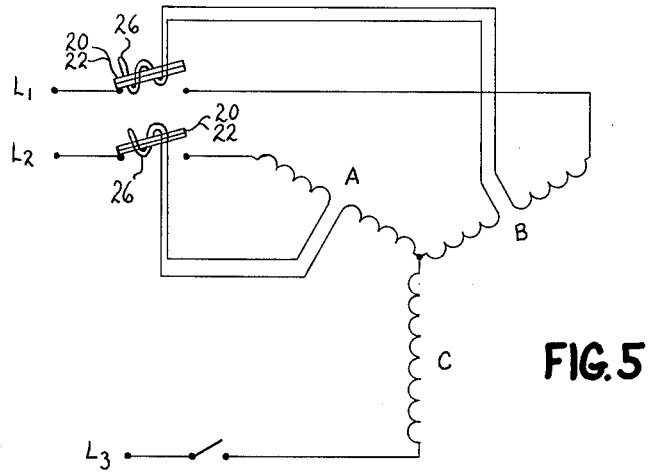
FIGURE 5 illustrates diagrammatically a circuit arrangement showing how the heat sensing element is connected to the motor winding.

Referring to FIGURE 5, A, B and C indicate the phases of a three phase, Y connected motor. The heat sensing element is shown as a bimetallic switch and leads 34 and 36 are connected in lines $L_1$ and $L_2$ which extend directly to the power source or to a control circuit of the type conventionally used for starting motors. The coil 26 on each heat sensing device is connected in series respectively with a coil in the stator winding as previously described.

During normal operation, the sensing device temperature is substantially the same as the winding end turns since the latter conduct and radiate directly to the device located within housing 30. Should the winding temperature increase for any reason other than an overcurrent condition, such as clogged air ventilation passageways, heat from the end turns will be transmitted directly by radiation and conduction to the sensing device located in housing 30. The temperature rise will be gradual and both the winding and sensing device temperature will rise at substantially the same rate and to the same level. Should a predetermined maximum temperature level be reached, the tube 22 will expand an amount sufficient to open switch 24 and interrupt the power supply to the motor winding and thus protect against winding burn-out. The winding and sensing device will cool at approximately the same rate and when tube 22 closes switch 24, the circuit to the motor winding again will be closed and normal operation will be resumed.

In the event an over-current condition should arise, as from motor overload, which is sufficiently great to cause damage of burn-out of the winding, the current flow in the motor winding also will flow through coil 26 wrapped on the sensing device. Heat in both will be generated at the same rate and it therefore will be transmitted to the device because of the direct contact between the coil 26 and tube 22. Expansion of tube 22 will open switch 24 and the power supply to the motor in the same manner described above, until the winding cools down and the situation remedies itself.

The above description and the drawing illustrates the use of two sensing devices having one coil per device for controlling the motor. Obviously, many variations fall within the scope of these teachings. A single protector or device 18 may be used successfully in protecting a single phase motor by locating it on the winding end turns as described above, and connecting the contacts of the switch in the heat sensing element in series with either the power source or a control circuit serving the motor. The coil 26 would be connected in series with one of the motor coil conductors in the same manner as described above, so that when an over-temperature condition exists, the sensing element would become operative to open the switch and thus shut off power to the motor. However, to protect a three-phase motor, it is desirable to use at least two protective devices as shown in FIGURE 5.

In lieu of using a single coil wherein the conductor turns are reversed on themselves and providing only two leads for connection into the motor winding, a single sensing device having a pair of coils may be used as illustrated in FIGURE 3, or three coils, Y connected, may be used as shown in FIGURE 4. In the two coil arrangement, one set of leads 38 are connected into a turn of a conductor in phase A, and the other set of leads 40 are connected with a conductor in a coil in phase B. Preferably the sensing device should be attached to the surface of phase C coils. In the event an over-temperature condition should arise as a result of phase A becoming de-energized, additional current flow will take place in phase B and heat its corresponding coil on the sensing device, and if the temperature rises to a dangerous level, it will act to shut off power to the motor and thereby protect the windings therein. In the event the unprotected phase C should become de-energized for any reason, phases A and B both will receive an additional amount of current which will cause heating of the conductors at a more rapid rate. Should this rate or a predetermined high temperature be reached in each of phases A and B, the protectors will act to shut off power to the motor.

In the three wire coil case, one end of each of the coils 38, 40 and 42 on the protector respectively are connected in series with phases A, B, and C. The other coil ends are welded together at 44 and connected to the Y point in the motor winding. Should an over-temperature condition exist in any one of the phases, its respective coil will heat the sensing element of the protector at a rate and to a temperature corresponding with that in the winding. If the rate of temperature rise or total temperature reaches an amount sufficient to cause expansion of the rod 20 and tube 22 to a point where the switch therein opens, power will be shut off to the motor. This arrangement will provide protection to all three legs or phases and is especially useful with unattended motors in remote locations.

Many motors employ a pair of separate windings employed for part winding starting purposes. In this arrangement, it is preferable to employ two protective devices, each having at least two coils 26 mounted on its surface. The coils on each device are connected respectively to two phases in each winding, thus providing motor protection under all expected conditions of operation. Obviously three coils per device may be used to protect all three phases.

It also will be apparent that if the temperature imparted to the sensing device is either higher or lower than that appearing in the phases which the device is designed to protect, wire of a different size may be used in the coil or coils 26 wound on the tube 22 to either increase or decrease the current density therein and thus obtain a greater or lesser amount of B.t.u. dissipation from the coil. This also would be applicable in the event a parallel arrangement of coil 26 and conductor in the winding were used. As indicated above, the protector preferably should be located in the hottest area on the winding end turns, as in the path of lowest air velocity, and this will vary according to the design and use of a particular motor. In hermetic motors for example, the device preferably should be located at the motor end where the refrigerant is discharged from the motor housing. In most cases, mounting the protector on the edge of the end turns is fully satisfactory and the additional benefit obtained from such mounting is ease of installation and maintenance. Although a particular design of protective or heat sensing device has been disclosed, types other than the particular one described may be wrapped with coils 26 for controlling power to the motor. The invention is applicable to rotors as well as stators having either form or random wound windings. It therefore is to be understood that within the scope of the appended claims, the invention may be practiced other than as specifically described.

What we claim as new and desire to secure by Letters Patent of the United States is:

1. A dynamoelectric machine comprising a magnetic core having slots and at least one winding therein including conductors having end turns projecting from opposite ends of the core, a temperature responsive device mounted on end turns of said winding and being in conductive heat exchange relationship therewith, said device including bimetallic elements connected with a switch, leads connecting said switch with means supplying power to said winding, a coil wound on said device, said coil being connected in series with a conductor in said winding, and thermal insulation means shielding said coil from the influence of any cooling medium flowing in the vicinity of said winding, so that when the winding heats from an over-temperature condition, the bimetallic elements respond to the combined influences of heat from the winding and from said coil and operate to open said switch and interrupt power supplied to the winding.

2. A dynamoelectric machine comprising a magnetic core having slots and a winding therein including conductors having end turns projecting from opposite ends of the core, a temperature responsive device mounted on one phase of said winding in conductive heat exchange relationship with end turns thereof, said device including bimetallic elements connected with a switch, leads connecting said switch with means supplying power to said winding, a coil wound on said device, said coil having leads connected in series with a conductor in a second phase of said winding, and thermal insulation means shielding said coil from the influence of any cooling medium flowing in the vicinity of said winding, so that when the winding heats from an over-temperature condition, the bimetallic elements respond to the combined influence of heat from the winding and from said coil and operate to open said switch and interrupt power supplied to the winding.

3. A combination according to claim 2 wherein one-half of the turns of wire in the coil on said device are reversed on themselves thereby to provide zero flux linkage in said device when current flows through the coil.

4. A dynamoelectric machine comprising a magnetic core having slots and a polyphase winding therein including conductors having end turns projecting from opposite ends of the core, a temperature responsive device mounted on one phase of said winding in conductive heat exchange relationship with end turns thereof, said device including bimetallic elements connected with a switch, conductors connecting said switch with means supplying power to said winding, a pair of coils wound on said device, each of said coils having leads connected in series respectively with a conductor in the two remaining two phases, and thermal insulation means shielding said coils from the influence of any cooling medium flowing in the vicinity of said winding, so that when the winding heats from an over-temperature condition either of the pair of bimetallic elements respond to the combined influence of heat from the winding and from its respective coil and operate to open its switch and interrupt power supplied to the winding.

5. A dynamoelectric machine comprising a magnetic core having slots and a polyphase winding therein including conductors having end turns projecting from opposite ends of the core, at least a pair of temperature responsive devices, one of said devices being mounted in conductive heat exchange relationship on end turns of a first phase of said winding and another of said devices mounted in conductive heat exchange relationship on end turns of one of the other phases, each of said devices including bimetallic elements having different coefficients of expansion connected with a switch, conductors individually connecting each of said switches with means supplying power to said winding, a coil wound on each of said devices, each of said coils having leads connected in series with a conductor in one of the remaining two phases, and means shielding said coils from the influence of any cooling medium flowing in the vicinity of said winding so that when the winding heats from an over-temperature condition, either of the pair of bimetallic elements respond to the combined influence of heat from the winding and from its respective coil and operate to open said switch and interrupt power supplied to the winding.

6. A dynamoelectric machine comprising a magnetic core having slots and a polyphase winding therein including conductors having end turns projecting from opposite ends of the core, a temperature responsive device mounted in conductive heat exchange relationship on end turns of said winding, said device including bimetallic elements connected with a switch, conductors connecting said switch with means supplying power to said winding, at least three coils wound on said device, each of said coils having leads connected in series respectively with a conductor in each phase of said winding, and means shielding said coils from the influence of any cooling medium flowing in the vicinity of said winding so that when the winding heats from an over-temperature condition, said bimetallic elements respond to the combined influence of heat from the winding and from at least one of said coils and operate to open said switch and interrupt power supplied to the winding.

7. The combination according to claim 6 wherein the leads extending from one end of said coils are joined and connected to the Y point of said winding.

8. A dynamoelectric machine comprising a magnetic core having slots and a pair of polyphase windings therein for providing part winding starting for the motor, each of said windings comprising a plurality of conductors having end turns projecting from opposite ends of the core, a pair of temperature responsive devices in conductive heat exchange relationship with end turns of each of said windings, one of said devices for each winding being mounted on a first phase thereof, and the other device of each pair being mounted respectively on one of the other phases, each of said devices including bimetallic elements having different coefficients of expansion connected with a switch, conductors individually connecting each of said switches with means supplying power to said windings, at least one coil wound on each of said devices, each of said coils on the devices for one winding having leads respectively connected to a conductor in each of two phases and each of said coils on said devices for the other winding having leads connected respectively in series with a conductor in each of the phases of said other winding, and means shielding said coils from the influence of any cooling medium in the vicinity of said winding so that when either one or both of the windings heat from an over-temperature condition, the bimetallic elements in either one or both of the devices mounted on the affected winding respond to the combined influence of heat from the winding and from its respective coil and operate to open its associated switch and interrupt power supplied to the appropriate winding.

References Cited by the Examiner
UNITED STATES PATENTS

| | | | |
|---|---|---|---|
| 2,304,599 | 12/1942 | Rigby | 318—473 |
| 2,662,203 | 12/1953 | Seely | 317—13.2 |
| 2,707,763 | 5/1955 | Kurtz | 318—473 |
| 2,758,255 | 8/1956 | Lytle | 317—13.2 |
| 2,782,353 | 2/1957 | Seely | 317—13.2 |
| 3,023,350 | 2/1962 | Broadley et al. | 318—221 |

ORIS L. RADER, *Primary Examiner.*

MILTON O. HIRSHFIELD, *Examiner.*